J. McM. LOVELESS.
DEMOUNTABLE RIM.
APPLICATION FILED APR. 24, 1919.
1,318,295.
Patented Oct. 7, 1919.
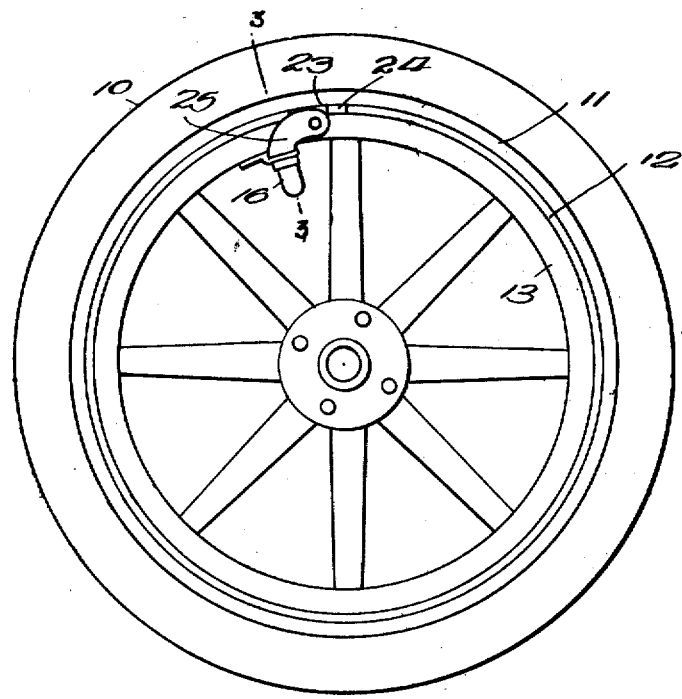
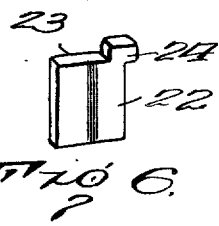
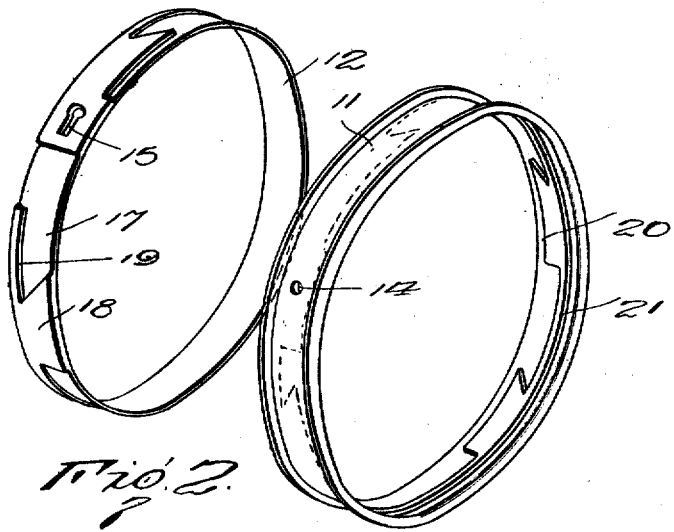
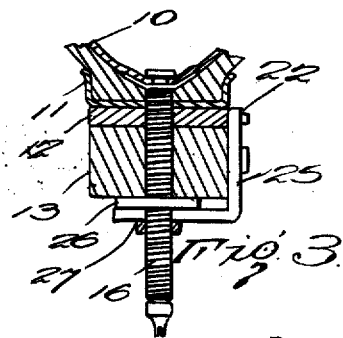
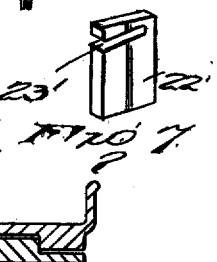
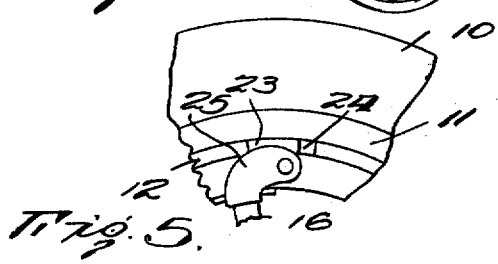
John McM. Loveless
Inventor
By Geo. P. Kimmel
Attorney

UNITED STATES PATENT OFFICE.

JOHN McMURRA LOVELESS, OF GLEZEN, INDIANA, ASSIGNOR OF ONE-HALF TO C. C. WILTON, OF GLEZEN, INDIANA.

DEMOUNTABLE RIM.

1,318,295.     Specification of Letters Patent.     Patented Oct. 7, 1919.

Application filed April 24, 1919. Serial No. 292,307.

*To all whom it may concern:*

Be it known that I, JOHN McMURRA LOVELESS, a citizen of the United States, residing at Glezen, in the county of Pike and State of Indiana, have invented certain new and useful Improvements in Demountable Rims, of which the following is a specification.

This invention relates to an improved demountable rim for use in connection with wheels such as automobile wheels and the principal object of the invention is to provide a rim which may be easily and quickly put in place or removed and which will be securely held in place against accidental removal when in use.

Another object of the invention is to provide improved means for holding the rim against rotary movement to a releasing position when in use, the wedge holding the rim being held in place by a clamp engaging the inflated valve of the tire and held in locking position by the valve securing nut.

Another object of the invention is to provide a rim of the character described which will be very strong and durable and not liable to break when in use and going over rough roads.

Another object of the invention is to provide a demountable rim which will be comparatively simple in construction and thus easy and cheap to produce.

This invention is illustrated in the accompanying drawings wherein—

Figure 1 is a view showing a wheel in side elevation and provided with the improved demountable rim, Fig. 2 is a perspective view showing the felly band and demountable rim, Fig. 3 is a transverse sectional view taken along the line 3—3 of Fig. 1, Fig. 4 is a transverse sectional view taken through the demountable rim and felly band, Fig. 5 is a fragmentary view in side elevation showing the manner of locking the securing wedge in place, and, Fig. 6 is a perspective view of the wedge.

Fig. 7 is a perspective view of a modified form of wedge.

This demountable rim is used for holding the pneumatic tire 10 and is indicated in general by the numeral 11. This demountable rim is positioned about the felly band 12 positioned about and secured upon felly 13 of the wheel in any suitable manner.

Registering openings 14 and 15 are formed in the rim and felly band 11 and 12 respectively so that the valve stem 16 may extend through the band and rim. It should be noted that the opening 15 is elongated as clearly shown in Fig. 2 so that proper rotary movement may be given when putting the demountable rim in place or removing it and thus permitting the interlocking lugs to be hereinafter described to be moved into and out of interlocking engagement.

The felly band which is clearly shown in Fig. 2 is provided with a smooth inner face and as previously stated will be rigidly secured upon the felly 13 by any suitable means such for instance as rivets or other fasteners. A collar 17 is positioned about this felly band and is cut to provide lugs or arms 18 of less width than the band and connected by a strip 19 of a width substantially the same as the difference between the width of the band and the width of the lugs. These lugs are cut straight or in other words at right angles to the band at one end and each has its opposite end undercut as clearly shown in Fig. 2 for the purpose of interlocking as hereinafter brought out. It has been stated that this collar is of a separate piece welded or otherwise rigidly secured upon the outer face of the band but it is to be understood that if desired this collar can be cast integral with the band. It should be noted that the strip 19 does not extend the full extent about the band but terminates short of the lug in which the opening 15 is formed thus providing an abutment shoulder the purpose of which will be hereinafter brought out.

The demountable rim is provided with the usual tire engaging flanges and is provided upon its inner face with lugs or arms 20 connected by strips 21. These may also be formed of a separate length and welded or otherwise rigidly connected with the rim or may be cast integral with the rim. The arms or lugs 20 will be of substantially the same width as the lugs 18 and the strips 21 will be of the same width as the strips 19. It will be further noted that the lugs 20 will each have one end portion cut at right angles to the rim and its opposite end portion undercut for interlocking engagement with the undercut end portion of the lugs 18. It will be further noted that the strip 21 and one of the lugs will be cut away at the opening 14 and upon opposite sides thereof to provide an abutment shoulder similar to the structure of the felly band 12.

When in use the felly band will of course be rigidly secured upon the felly of the wheel and will remain thereon as a permanent structure. The demountable rim will be positioned about the felly band with the lugs of the rim positioned between the lugs of the band and with the opening 14 positioned at one end of the opening 15. The rim will now be turned with the wheel held stationary and this will cause the rim to turn upon the felly band until the under cut end portion of the lugs 18 and 20 interlock thus providing a substantially solid structure. It should be noted that when in this position the strips 19 and 21 extend along the sides of the lugs thereby assisting in preventing transverse movement of the rim and thereby adding greater strength to the wheel. When in this position the cut away portion of the lug and strip of the rim will extend in overlapping relation to the cut out portion of the strip and lug of the felly band thereby providing a passage between the felly band and the rim through which will be passed the wedge 22. This wedge 22 is constructed as shown in Fig. 6 and has its outer end portion cut away to provide the seat 23 and shoulder 24. The shoulder 24 limits inward movement of the wedge and the seat 23 terminates substantially flush with the edge of the felly band so that the pivotally mounted clamp 25 may engage upon this seat and thus prevent removal of the wedge. This clamp 25 is pivotally connected with the felly and extends to engage the valve stem 16, a gasket 26 being positioned upon the stem to cover the slot 15 and a securing nut 27 being screwed upon the stem and engaging the clamp as shown in Fig. 3 to securely but releasably hold this clamp in an operative position.

It will thus be seen that with this construction the demountable rim may be easily put in place and turned to a locking position and then secured through the medium of the wedge and valve stem engaging clamp and that when in place it will be securely held against transverse slipping and against rotary movement. It will be further noted that when necessary the rim may be easily removed by releasing the clamp thus permitting it to be swung to an inoperative position and then driving out the wedge thus releasing the rim and permitting it to be turned to the original position so that the lugs will be brought out of operative engagement and removal of the rim permitted.

I have therefore provided a very strong and durable rim which will be comparatively simple in construction and very efficient in operation.

In Fig. 7 there has been shown a slightly modified construction of wedge which may be used in place of the wedge shown in Fig. 6 if so desired. This wedge 22' takes the place of the wedge 22 and is provided with slot 23' into which the clamp 25 will pass thereby permitting the clamp to hold the wedge against inward or outward movement and making it unnecessary to provide the shoulder 24. It should be noted that this slot 23' is cut at an incline thus providing a cam face permitting the clamp to force the wedge tightly into place and also permitting the clamp to loosen the wedge when the clamp is swung to a releasing position.

What is claimed is:

1. The combination with a wheel including a felly of a felly band positioned about the wheel and provided upon its outer peripheral face with lugs each undercut at one end, the band being provided with a cut out, a rim fitting upon the band and provided upon its inner peripheral face with lugs each having one end portion undercut for interlocking engagement between the lugs of the rim and band, the rim being provided with a cutout registering with the cutout of the band for passage of a valve stem through the registering cut out a wedge extending transversely between the rim and band and engaging the lug to prevent rotation of the rim upon the band when the lug is in place, and a clamp for engaging the valve stem of a tire movably mounted and extending to engage the wedge and retain the wedge in place when swung to an operative position.

2. The combination with a wheel including a felly having a valve stem receiving passage, of a felly band positioned about the felly and provided with a cutout for registering with the valve stem passage, a rim positioned about the felly band and provided with a cutout for registering with the cutout of the band, lugs carried by the band and rim for interlocking engagement when the rim is placed upon the band and rotated a predetermined extent, a wedge positioned between the rim and band for holding the rim against rotation to a releasing position, and a valve stem engaging clamp positioned to engage the lug and retain the same in place when the clamp is swung to an operative position.

In testimony whereof, I affix my signature hereto.

JOHN McMURRA LOVELESS.

Copies of this patent may be obtained for five cents each, by addressing the "Commissioner of Patents, Washington, D. C."